Sept. 7, 1937.  M. OLLEY  2,092,612

AUTOMOBILE SUSPENSION SYSTEM

Original Filed Feb. 3, 1934  2 Sheets-Sheet 1

Inventor
Maurice Olley
By Blackmore, Spencer & Flint
Attorneys

Sept. 7, 1937.  M. OLLEY  2,092,612
AUTOMOBILE SUSPENSION SYSTEM
Original Filed Feb. 3, 1934  2 Sheets-Sheet 2
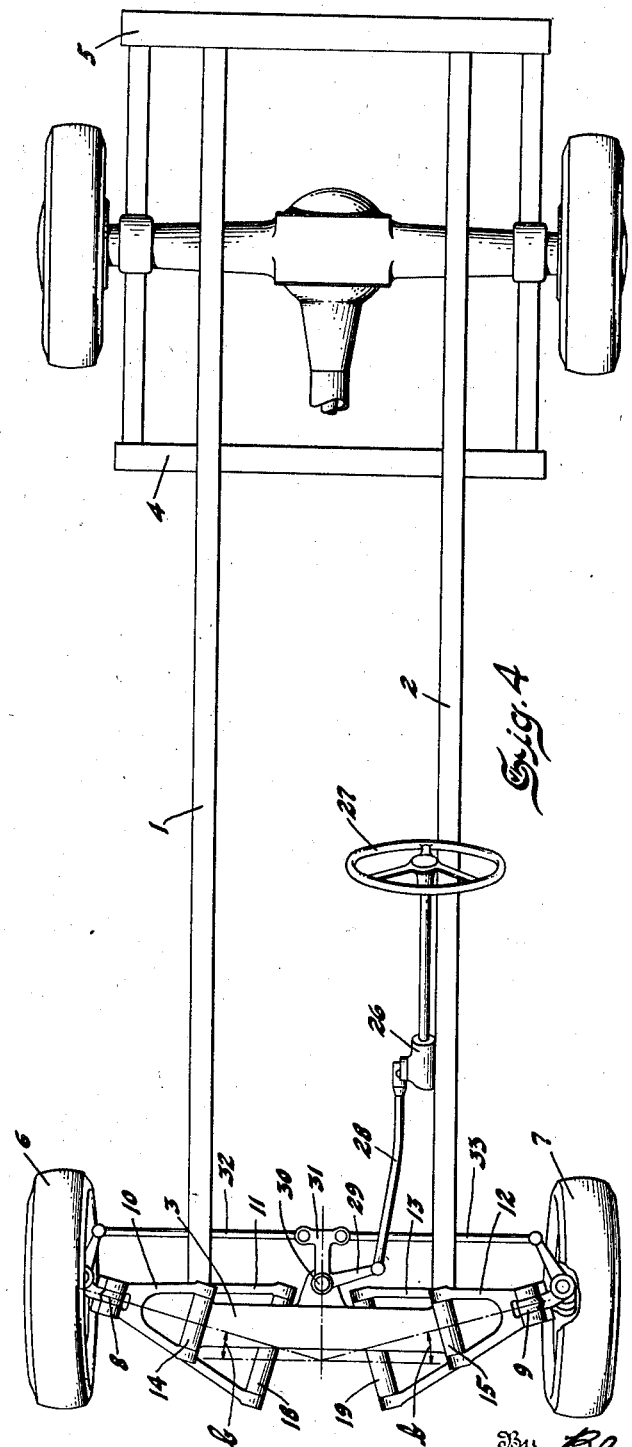
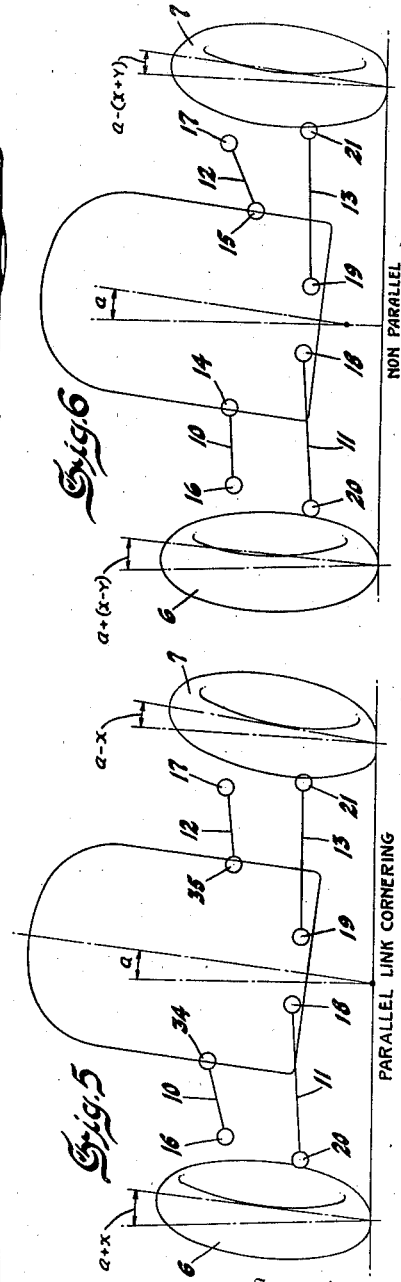
Inventor
Maurice Olley Patented Sept. 7, 1937

2,092,612

UNITED STATES PATENT OFFICE 2,092,612

AUTOMOBILE SUSPENSION SYSTEM

Maurice Olley, Detroit, Mich., assignor to General Motors Corporation, Detroit, Mich., a corporation of Delaware Application February 3, 1934, Serial No. 709,565
Renewed October 31, 1936

5 Claims. (Cl. 280—124)

This invention relates to motor vehicles having independent suspension of the dirigible road wheels of that type in which a wheel supporting member for each road wheel is pivotally mounted between the outer ends of two laterally extending links which are pivoted one above the other to the chassis frame so as to be capable of swinging motion in a substantially vertical plane transverse to the longitudinal axis of the vehicle—suitable spring means being provided—resiliently restraining upward swinging movement of the links relative to the vehicle frame.

In such suspension systems the pivotal swinging motion of the linkage relative to the frame, under the influence of spring deflecting forces at the road wheel, is accompanied by a variation either in the distance between the plane of the wheel and the normally vertical longitudinal mid-plane of the vehicle, or in the degree of parallelism of the wheel planes to the mid-plane of the vehicle, or in both these respects simultaneously.

If the links are parallel to one another and of equal length—forming a "parallelogram" linkage system—the wheel plane moves at all times substantially parallel to the longitudinal mid-plane of the vehicle under the influence of spring deflecting forces and there is a variation in the distance between the wheel plane and the mid-plane of the vehicle.

When the links are parallel, but the length of the upper link bears to the length of the lower link approximately the same ratio as the height of the lower link from the ground bears to the height of the upper link from the ground—forming a parallel-sided trapezoidal linkage system—tilting of the wheel plane relative to the longitudinal mid-plane of the vehicle occurs and the point of contact between the wheel and the ground is maintained a constant distance from the mid-plane as the wheel moves up and down under the influence of spring deflecting forces—or in other words the track is maintained constant, and lateral scrubbing of the tires on the road is avoided.

While with the "parallelogram" linkage system the plane of each wheel moves parallel to itself and is generally held substantially parallel to the vertical longitudinal mid-plane of the vehicle, in this way reducing gyroscopic reactions in the wheels, the latter system in which the track is maintained constant is preferred especially for heavier vehicles since the movement of the links is of such a nature as to reduce or reverse the "normal" camber of the front wheels when the vehicle rolls, which is advantageous for reasons later to be given.

In the first-mentioned "parallelogram" linkage system, when the vehicle rolls in turning corners, the wheels roll through the same angle—i. e. the plane of the wheels is tilted through the same angle.

The effect of thus increasing the angle between the planes of the wheels and the vertical, increasing the camber tilt on the wheel to the outside of the turn and giving negative camber to the inside wheel, is twofold.

Firstly, the centripetal force—i. e. the radial road reaction acting at certain points in the areas of contact of the tires with the road and thrusting the car round the turn—which is virtually independent of the load on the wheel when the wheel has no camber tilt and which increases with the inflation pressure of the pneumatic tire, is reduced by an amount depending on the extent to which the wheel plane is tilted to the outside of the radius about which the vehicle is turning—i. e. the extent to which the outward cambering of the outer wheel is increased and the inward cambering of the inner wheel is increased. This may be measured by the change in the angle which the wheel planes make to the vertical.

The change in wheel tilt is of course accompanied by an increase in tire pressure on the outer wheel and a reduction in tire pressure on the inner wheel. Although the side force which a tire can exert when without tilt is practically independent of the load, this force falls off somewhat with increasing load when the tire is tilted. There is, as a result, some reduction of centripetal force due to unequal loading of the tilted wheels. This reduction is more serious with low pressure tires.

Secondly, the angle to which the wheel planes of the front wheels are tilted from the vertical induces an increased torque about the king pin tending to swing or straighten out the wheels and restore them to a position for straight ahead movement of the vehicle.

Because of the first effect, causing a loss in centripetal force, it is necessary to increase the angle through which the front wheels are swung to make the turn. It has been found that the centripetal force caused by the angle through which the front wheels are swung is not applied at the center of the contact area between tire and road, but is applied some distance to the rear thereof. Because of this fact, the centripetal force has a marked tendency to swing the wheels back to the straight ahead position.

Because of the second effect, causing an increased restoring torque about the king pin, it is necessary for the driver to apply an effort sufficient to overcome this in holding the car in a turn.

In addition then, to overcoming the normal "self-centering" effects on the front wheels due to caster angle, offset of the dirigible wheels from their king pins, and the inclination between the king pin and the ground, all common to vehicles with the more conventional suspension using rigid axles as well as to vehicles with independent suspension, the driver of a vehicle with independent suspension must turn or swing the dirigible wheels through a greater angle and must also overcome the increased restoring torque due to the rolling of the wheel planes, when the car rolls in making a turn.

It is not always practicable to provide a steering gear of adequate reduction ratio to enable a driver to overcome all five of the foregoing self-centering forces on the heaviest cars without undue effort, but even when this is done, if the steering wheel is released to allow the vehicle to restore itself to a self-centered condition of the dirigible wheels, all five of the self-centering effects tend to spin the steering wheel back so vigorously that the driver may lose control or even suffer injury.

In the parallel sided trapezoidal linkage system with a shorter upper link parallel with a longer lower link, the shorter upper link reduces the tilt on the outer wheel. The reduced tilt results in less loss of centripetal pressure as the car rolls as compared to a suspension having links of equal length. The torque tending to restore the road wheels to a straight ahead position is also reduced. As commonly arranged, however, it also increases the tilt from the vertical, i. e. the reverse camber of the inner wheel. Since, however, the inner wheel is more lightly loaded than the outer wheel, there is a net gain due to the improved conditions of the outer wheel. Also on sharp turns such as street corners, and when braking in turns, the car dives forward so that the inner wheel does not drop as much as the outer wheel rises relative to the frame.

The object of the invention is to reduce still further the "self-centering" or restoring forces on the dirigible wheels of a vehicle having independent suspension of the road wheels of the foregoing general type, when the vehicle rolls on turning a corner.

The above and other objects of the invention will be apparent as the description proceeds.

According to the invention, a non-parallel-sided trapezoidal linkage system is provided for each dirigible road wheel, in which—while the length of the upper link bears to the length of the lower link approximately the same ratio as the height of the lower link from the ground normally bears to the height of the upper link from the ground,—the pivot axis for the inner end of the upper link is dropped while the lower link remains normally horizontal.

In addition, if desired, according to the invention, the links may be arranged so that their planes of action are raked backward relative to a plane normal to the vertical longitudinal mid-plane of the vehicle, still further reducing the "self-centering" forces on the dirigible road wheels.

The drawings show the application of the invention to the independent front wheels of the chassis of a motor vehicle having a conventional rear axle.

In the drawings:

Figure 4 is a plan view of a vehicle embodying suspension means for the front dirigible wheels according to the invention, and having a conventional rear wheel suspension.

Figure 5 is a diagrammatic front elevation of a vehicle with a parallel-sided trapezoidal pivotal linkage system for each dirigible road wheel, with the planes of action of the linkages normal to the vertical longitudinal mid-plane of the vehicle, and showing the position of the parts when the vehicle is rolling to the right as seen in the drawings.

Figure 1:
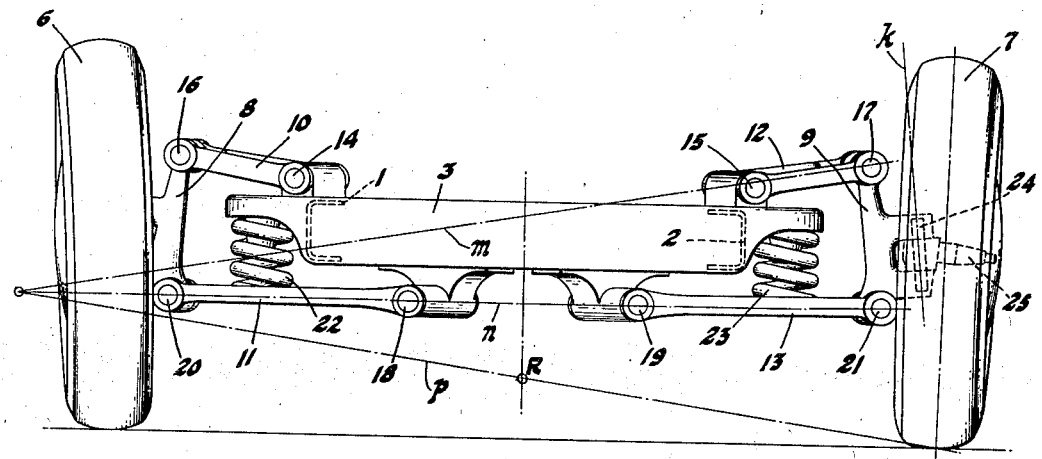
Figure 1 is a front elevation of the vehicle frame with suspension means for the front dirigible wheels according to the invention.
Figure 2:
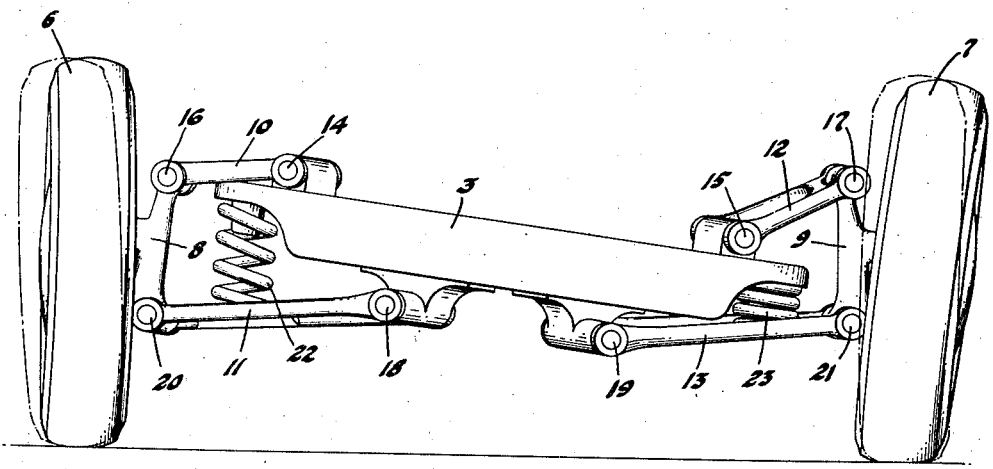
Figure 2 is a view similar to Figure 1, but showing the position of the parts when the vehicle is rolling to the right as seen in the drawings—i. e. rolling to the left, as when the vehicle is turning to the right, as seen from the driver's seat.

Figure 6 is a diagrammatic front elevation of a vehicle with a non-parallel-sided trapezoidal linkage system for each dirigible road wheel according to the invention—corresponding to Figures 1 and 2 but with the planes of action of the linkages normal to the vertical longitudinal mid-plane of the vehicle—and showing the position of the parts when the vehicle is rolling to the right as seen in the drawings; through the same angle as the vehicle of Figure 5.

Referring now to Figures 1, 2, 3, 4 and 6, 1 and 2 are the side members of the frame which is provided with cross members 3, 4 and 5.

The dirigible road wheels 6 and 7 are each carried respectively on wheel supporting members which may be knuckle bracket support members 8 and 9.

The knuckle bracket support member 8 is pivotally mounted between the outer ends of laterally extending links 10 and 11—V-shaped in plan—which are pivoted one above the other to the frame, so as to be capable of swinging motion in a substantially vertical plane.

The knuckle bracket support member 9 is pivotally mounted between the outer ends of similar laterally extending links 12 and 13.

The length of the upper links 10 and 12 bears to the length of the lower links 11 and 13 approximately the same ratio as the height of the links 11 and 13 from the ground normally bears to the height of the links 10 and 12 from the ground.

The lower links 11 and 13 are normally horizontal while the pivot axes 14 and 15 of the inner ends of the upper links 10 and 12 are so positioned that when the lower links 11 and 13 are horizontal, the upper links slope downwards towards the mid-plane of the car frame from their pivot axes 16 and 17 on the knuckle bracket support members 8 and 9 respectively.

18 and 19 are the pivot axes for the inner ends of the lower links 11 and 13 on the frame, while 20 and 21 are their pivot axes on the knuckle bracket support members 8 and 9 respectively.

The position of the axes 14, 18 and 15, 19 is such that the planes of action of the pivotal linkages are raked backward relative to a plane normal to the longitudinal mid-plane of the vehicle, an angle $b$ as shown in Figure 4.

Coil springs 22 and 23 interposed between the frame cross member 3 and the links 11 and 13 respectively, resiliently restrain upward swinging movement of the linkages relatively to the frame.

Figure 3:
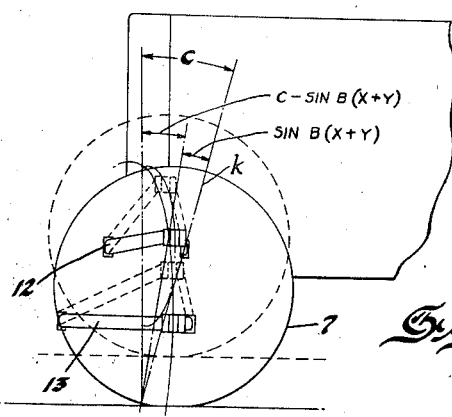
Figure 3 is a diagrammatic side view showing two positions of the parts of the suspension system of the wheel to the right in Figures 1 and 2, corresponding to the position of these parts in Figures 1 and 2, but showing in an exaggerated way the change in caster angle.

Each knuckle bracket support member is provided with a king pin such as 24, to which the wheel spindle forging 25 is secured. As shown in Figure 3, the axis $k$ of each king pin is raked backward from the vertical to provide the king pin with the usual caster angle $c$.

The steering gear 26 is provided with the steering wheel 27 and has its drag link 28 connected to the bell crank lever 29 pivoted at 30 on the vehicle frame and having a T-head 31 to which separate tie rods 32 and 33 to each road wheel 6 and 7 are connected.

Referring now to the diagrammatic Figure 5, the parts and their normal relationships to one another, are identical with those of Figures 1, 2, 3, 4, and 6 except that the inner ends of the upper links 10 and 12 pivot about axes 34 and 35 which are so positioned that when the lower links 11 and 13 are horizontal, the upper links are horizontal and parallel thereto, constituting parallel-sided trapezoidal pivotal linkages for the dirigible road wheels.

It will be apparent that—while with a "parallelogram" linkage system for each dirigible road wheel the wheels tilt through an angle equal to the angle $a$ through which the frame of the vehicle rolls in turning a corner—in the construction according to Figure 5, with a parallel-sided trapezoidal pivotal linkage system the wheel 7 (to the outside of the radius about which the vehicle is turning) will tilt through an angle less than $a$ by an angle denoted by $x$, while the inner wheel 6 will tilt through an angle greater than $a$ by the same angle, which is proportional to spring deflection, and the "self-centering" or restoring forces will be reduced as compared with the same forces when a "parallelogram" linkage system is used.

The symbol $x$ represents the amount by which the tilt angle $a$ of the outer and inner wheels respectively of a "parallelogram" linkage system is decreased and increased for upward and downward deflection of the wheel relatively to the vehicle frame when the upper link is shorter than the lower link in a parallel-sided trapezoidal pivotal linkage system in which the upper and lower links are normally horizontal. The angle $x$ is proportional to the square of the deflection, and is due to the fact that the outer ends of the upper and lower links move in arcs of different radii. In the construction according to Figure 5, the tilt of the outer wheel for an angle of roll $a$ is therefore $a-x$, and for the inner wheel $a+x$.

Referring now to the construction shown in Figures 1, 2, 3, 4, and 6 according to the invention, and particularly to Figure 6, the lowering of the inner end of the upper links so that they slope downwards towards the mid-plane of the vehicle introduces another term $y$ which is approximately proportional to the deflection and which is approximately equal for the inner and outer wheels for the deflections usual in a commercial design. This term increases still further the angle by which the tilt of the outside wheel is reduced, and reduces the angle by which the tilt of the inside wheel is increased. The "scrub" or lateral movement of the tire contact away from the vehicle now becomes appreciable but not serious.

The symbol $y$ represents the amount by which the lowering of the inner end of the upper link increases $x$ for upward deflections and decreases $x$ for downward deflections, and is directly proportional to the deflection. In the construction according to Figure 6, the tilt of the outer wheel for an angle of roll $a$ is therefore $a-(x+y)$, and for the inner wheel $a+(x-y)$. The lowering of the inner end of the upper link therefore has reduced the tilt of both inner and outer wheels by the term $y$.

The extent to which the inner end of the upper link may be lower than the outer end is governed by the rate of change of the tilt of the wheel planes, as the wheels move up and down, which if excessive, may induce gyroscopic flick of the front wheels which would be objectionable at the steering wheel.

As shown in Figure 1, the instantaneous center R about which the car rolls has been raised from the ground level, reducing the moment arm of the centrifugal force about this center and therefore actually reducing the angle of roll. The instantaneous center R is obtained by producing the links 12 and 13 for wheel 7 by lines $m$ and $n$ to their point of intersection, and drawing a line $p$ from their point of intersection to the point of contact of the wheel 7 with the ground. R is the point of intersection of the line $p$ and the normally vertical longitudinal mid-plane of the vehicle.

The construction according to the invention with the inner ends of the upper links 10 and 12 downwardly inclined improves, therefore, the tilt angles of both outer and inner wheels in cornering, while it also reduces the actual angle of roll by raising the roll center as compared with the construction according to Figure 5.

When, as illustrated in Figures 1, 2, 3, and 4, the planes of action of the linkages are raked backward through the angle $b$ the change in the tilt angle of the wheels—$x$ in the parallel-sided trapezoidal linkage system; or $x-y$ and $x+y$ in the non-parallel-sided trapezoidal linkage system according to the invention—must be multiplied by the cosine of the angle $b$. This reduces slightly the improvement in the tilt angle of the outer wheel while improving only very slightly the tilt angle of the inner wheel, but has the advantage of reducing the caster angle $c$ of both wheels, particularly the outermost heavily loaded wheel.

The change in the caster angle is the change in the tilt angle multiplied by the sine of the angle $b$—i. e. in the case of the outer wheel of the non-parallel-sided trapezoidal linkage system, sine $b(x+y)$.

The reduction in effort required at the steering wheel to hold a car in a turn is therefore considerable, when—in a construction having the upper link shorter than the lower link—the inner end of the upper link is lower than the outer end because the raising of the roll center reduces the actual angle of roll, and because the tilt of the road wheels is reduced.

The conditions for cornering are still further improved and the reduction in effort required at the steering wheel is still greater when the plane of action of the linkages are raked backward relative to a plane normal to the vertical longitudinal mid-plane of the vehicle because the caster angle on the outer more heavily loaded wheel is reduced.

I claim:
1. An independent suspension system for the dirigible road wheels of a motor vehicle, in which a wheel support member for each road wheel is provided with spaced pivot axes for each of the outer ends of upper and lower laterally extending swinging links, of which the upper link is shorter than the lower link, the inner ends of said links being mounted on pivot axes one above the other on the vehicle frame, the pivot axes of the upper link being so positioned that in the normal condition when the lower link is horizontal, the upper link slopes downward from its pivot axes at its outer end to its pivot axes at its inner end; all said pivot axes being forwardly divergent from the longitudinal axis of the vehicle, whereby the links swing in a substantially vertical plane intersecting the longitudinal axis of the vehicle in front of a vertical plane normal to the longitudinal axis of the vehicle and passing through the centers of the dirigible road wheels.

2. An independent suspension system for the dirigible road wheels of a motor vehicle, in which a wheel support member for each road wheel includes a king pin provided with the usual caster angle, each wheel support member being pivotally mounted between the outer ends of upper and lower laterally extending links capable of swinging motion in a substantially vertical plane, the inner ends of the links being mounted on pivot axes one above the other on the vehicle frame, said pivot axes being so arranged and disposed that the links normally converge towards the longitudinal axis of the vehicle in the said plane, whereby when the vehicle rolls in turning a corner, the angle through which each of the road wheels is tilted relatively to the road and to the outside of the radius about which the vehicle is turned is reduced; said pivot axes being also forwardly divergent from the longitudinal axis of the vehicle so that the plane in which the links swing intersects the longitudinal axis of the vehicle in front of a vertical transverse plane passing through the centers of the dirigible wheels, whereby the caster angle of the king pin is also reduced at those times as the said tilt of each of the dirigible road wheels is reduced.

3. The combination according to claim 2 in which the upper link is shorter than the lower link.

4. In an independent suspension system for the dirigible road wheels of a motor vehicle, in which a wheel support member for each road wheel includes a king pin provided with the usual caster angle, each wheel support member being pivotally mounted between the outer ends of upper and lower laterally extending links capable of swinging motion in a substantially vertical plane, the inner ends of the links being mounted on pivot axes one above the other on the vehicle frame, means reducing the angle of roll of the vehicle when the vehicle is negotiating a turn, including pivot axes for the said links on the wheel support member and on the vehicle frame, so arranged and disposed relative to one another that the links normally converge towards the longitudinal axis of the vehicle in the said plane, whereby when the vehicle rolls in turning a corner and the outer wheel is deflected upwardly and the inner wheel downwardly, relatively to the vehicle frame, there is scrubbing of the tires of both wheels outwardly relative to the normally vertical longitudinal mid-plane of the vehicle from the center of the radius about which the vehicle is turning and the angle through which the plane of each of the road wheels is tilted relatively to the road and to the outside of the radius about which the vehicle is turning is reduced; the aforesaid pivot axes being also forwardly divergent from the longitudinal axis of the vehicle so that the plane in which the links swing intersects the longitudinal axis of the vehicle in front of a vertical transverse plane passing through the centers of the dirigible wheels, whereby the caster angle of the king pin is also reduced when the vehicle rolls in negotiating a turn.

5. The combination according to claim 4 in which the upper link is shorter than the lower link.

MAURICE OLLEY.